Feb. 17, 1925.  1,526,369
E. O. POLLARD
ELECTRIC HEATER
Filed Jan. 5, 1923
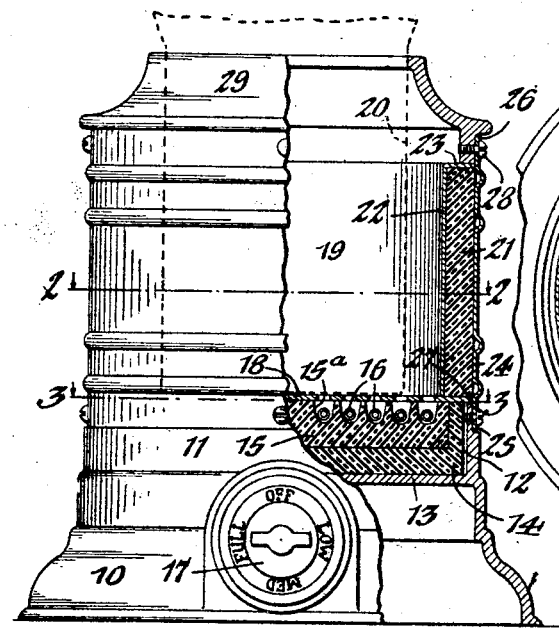
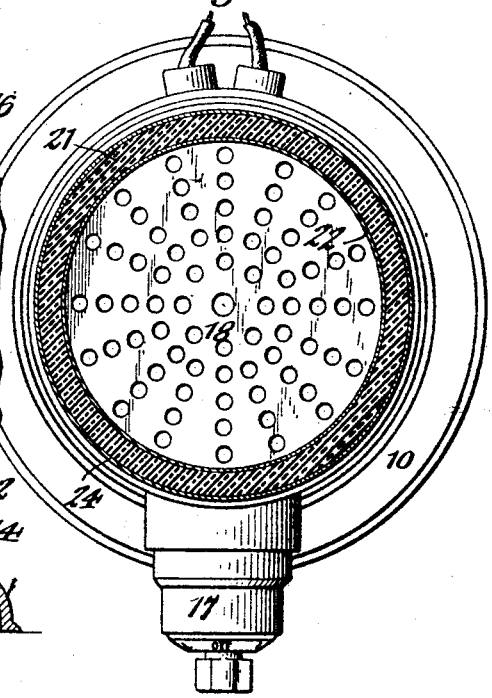
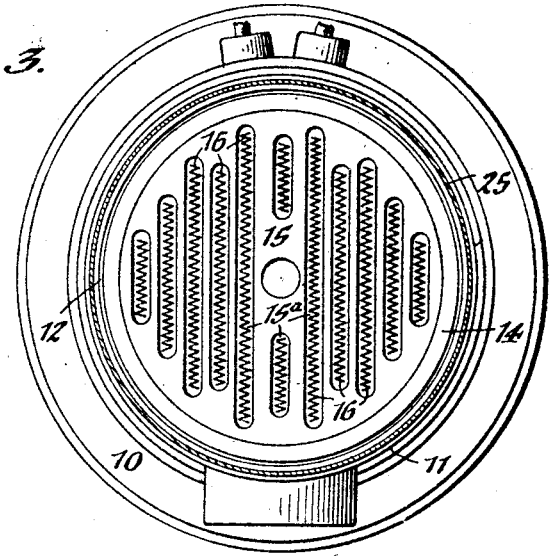
Inventor;
Ernest O. Pollard,
by Geyer Popp
Attorneys.

Patented Feb. 17, 1925.

1,526,369

UNITED STATES PATENT OFFICE.

ERNEST O. POLLARD, OF BUFFALO, NEW YORK, ASSIGNOR TO BUFFALO DENTAL MFG. CO., OF BUFFALO, NEW YORK, A CORPORATION OF NEW YORK.

ELECTRIC HEATER.

Application filed January 5, 1923. Serial No. 610,741.

*To all whom it may concern:*

Be it known that I, ERNEST O. POLLARD, a citizen of the United States, residing at Buffalo, in the county of Erie and State of New York, have invented new and useful Improvements in Electric Heaters, of which the following is a specification.

This invention relates generally to electric heating devices and more particularly to heaters for dental vulcanizers.

It is one of the objects of the invention to provide an improved heater of this character in which the walls are effectually insulated, enabling the vulcanizer to be heated to the desired temperature in a comparatively short time and to be held at such temperature for the required period.

A further object is the provision of a simple and efficient electric heater which can be readily assembled and dismembered and at the same time insure tight joints between the various parts to prevent loss of heat.

In the accompanying drawings: Figure 1 is a sectional elevation of a heater embodying my improvements. Figures 2 and 3 are horizontal sections taken on the correspondingly numbered lines in Fig. 1.

Similar characters of reference indicate corresponding parts in the several views.

The heater comprises a supporting base 10 preferably of cylindrical form, which is provided at its upper end with an upright, annular flange or rim 11 forming an upwardly-opening socket 12 having a closed bottom 13. Seated in this socket is a cup 14 constructed of suitable insulating material. Arranged in this cup is the insulated base 15 of an electric heating element having a series of grooves 15ª in its upper side containing the customary heating coils 16. The latter are included in an electric circuit controlled by a suitable multiple switch 17 for regulating the heat. Resting on the heating element is a perforated grid or protecting plate 18. This plate may be of metal while the base 15 of the heating element may be of porcelain or other appropriate insulating material.

Disposed above the heating element is a cylindrical heating chamber 19 for receiving the vulcanizing pot 20 or other article to be heated, which rests directly on the grid 18. This chamber is preferably formed by a double-wall drum or casing having a cylindrical insulating member 21 between its spaced walls, to prevent radiation of heat from said chamber, so far as possible. This insulator 21 and the inner wall 22 of said casing rest upon the protecting plate 18, and said wall is provided at its upper end with an outwardly-extending flange 23 which overlaps the upper end of the insulating member 21, as shown in Fig. 1. The outer wall 24 of the casing extends a suitable distance beyond the corresponding upper and lower ends of said insulating member to form attaching flanges or extensions 25 and 26. The lower flange 25 fits over the rabbeted upper end of the base-rim 11 to which it is secured by screws 27 or other suitable fastenings. Attached to the upper flange 26 of the casing by screws 28 or other means, is a head-ring 29, through which the vulcanizing pot 20 extends, as shown by dotted lines in Fig. 1. This ring is arranged within the outer casing-wall 24 and bears upon the adjacent flange 23 of the inner wall 22, thereby tightly clamping said flange between the ring and the upper end of the insulating member 21, and at the same time securely holding the grid 18 and the insulating cup 14 in place.

The flanges 25, 26, of the outer casing-wall extend over the joints between the casing and the head-ring and the grid 18, rendering the heating chamber practically air tight and effectively guarding against the loss at those points.

By the use of this heater, the contents of the pot 20 can be heated to the required vulcanizing temperature in a minimum perior of time, and as the loss of heat due to radiation is practically negligible, it is possible to maintain that temperature for a considerable period; even though the switch 17 be turned to its "low" or "off" position after reaching the desired degree, thereby effecting an important saving in current.

I claim as my invention:

1. An electric heater of the character described, comprising a base, a heating element supported on said base, a grid overlying said heating element, a casing forming a heating chamber surmounting said grid, said casing being attached at its lower end to said base, a head-ring attached to the upper end of said casing, and an insulating member applied to the inner side of said casing and confined between said ring and said grid.

2. An electric heater of the character described, comprising a base, a heating element supported on said base, a grid overlying said heating element, a casing forming a heating chamber surmounting said grid and consisting of spaced inner and outer walls and an interposed insulating member, said outer wall being attached to said base and said inner wall and said insulating member resting on said grid, and a head-ring attached to the upper end of said outer wall, said inner wall being provided at its upper end with an outwardly turned flange confined between said ring and the upper end of said insulating member.

3. An electric heater of the character described, comprising a base having a raised rim forming an upwardly-opening socket, a heating element arranged in said socket, and a heating chamber disposed above said heating element and consisting of spaced inner and outer walls and an interposed insulator, said outer wall extending below said insulator and being attached to the rim of said base.

4. An electric heater of the character described, comprising a base having a raised rim forming an upwardly-opening socket, a heating element arranged in said socket, and a heating chamber disposed above said heating element and consisting of spaced inner and outer walls and an interposed insulator, said outer wall extending below said insulator and being attached to the rim of said base, the upper end of the inner wall having a flange extending outwardly over the top of said insulator, and a head ring applied to the upper end of said outer wall and bearing upon said flange.

5. An electric heater of the character described, comprising a base having a raised rim forming an upwardly-opening socket, a heating element arranged in said socket, a heating chamber disposed above said heating element and consisting of spaced inner and outer walls and an interposed insulator, the upper and lower ends of said outer wall extending beyond the corresponding ends of the insulator, to form attaching flanges and the upper end of said inner wall having an outwardly-turned flange extending over the top of the insulator, and a head-ring secured to the upper attaching flange of the outer casing-wall for clamping said out-turned flange between it and the opposing end of the insulator, the lower attaching flange of said outer casing-wall being secured to the rim of said base.

ERNEST O. POLLARD.